United States Patent
Chen et al.

(10) Patent No.: US 9,396,028 B2
(45) Date of Patent: *Jul. 19, 2016

(54) SCHEDULING WORKLOADS AND MAKING PROVISION DECISIONS OF COMPUTER RESOURCES IN A COMPUTING ENVIRONMENT

(71) Applicant: International Business Machines Corporation, Armonk, NY (US)

(72) Inventors: Chong Chen, Richmond Hill (CA); Zhenhua Hu, Toront (CA); Daesuk Kang, Mississauga (CA); Qi Wang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 171 days.

This patent is subject to a terminal disclaimer.

(21) Appl. No.: 14/150,877

(22) Filed: Jan. 9, 2014

(65) Prior Publication Data

US 2015/0143382 A1  May 21, 2015

Related U.S. Application Data

(63) Continuation of application No. 14/081,207, filed on Nov. 15, 2013, now Pat. No. 9,262,220.

(51) Int. Cl.
*G06F 9/46* (2006.01)
*G06F 9/50* (2006.01)

(52) U.S. Cl.
CPC .............. *G06F 9/5005* (2013.01); *G06F 9/50* (2013.01); *G06F 9/5027* (2013.01); *G06F 2209/503* (2013.01)

(58) Field of Classification Search
CPC .................................................. G06F 9/5005
USPC ........................................................ 718/1–108
See application file for complete search history.

(56) References Cited

U.S. PATENT DOCUMENTS 7,370,326 B2 * 5/2008 Jones et al. ................... 718/102
8,104,041 B2    1/2012 Belady et al.
(Continued)

FOREIGN PATENT DOCUMENTS

JP        2011501268 A       1/2011

OTHER PUBLICATIONS

Beloglazov, Anton, Jemal Abawajy, and Rajkumar Buyya. "Energy-aware resource allocation heuristics for efficient management of data centers for cloud computing." Future generation computer systems 28.5 (2012): pp. 755-768.*

(Continued)

*Primary Examiner* — Satish Rampuria
(74) *Attorney, Agent, or Firm* — Daniel R. Simek (57) ABSTRACT

Embodiments of the present invention disclose a computer-implemented method, computer program product, and system for workload scheduling and resource provisioning. In one embodiment, in accordance with the present invention, the computer implemented method includes the steps of scheduling a set of pending workloads for execution on computer resources in a computing environment; identifying a workload in the set of pending workloads that is scheduled to utilize hypothetic resources, wherein hypothetic resources are idle computer resources that are currently not available, but can be made available to execute workloads through provisioning actions; holding the identified workload from dispatch to hypothetic resources for a holding period, wherein the holding period is a customizable duration of time; provisioning the hypothetic resources corresponding to computer resource requirements of the identified workload; determining whether the provisioned hypothetic resources have become available during the holding period.

7 Claims, 3 Drawing Sheets

(56) References Cited

U.S. PATENT DOCUMENTS

| | | | |
|---|---|---|---|
| 8,341,624 B1 | 12/2012 | Hobbs | |
| 8,433,802 B2 | 4/2013 | Head et al. | |
| 8,458,717 B1 | 6/2013 | Keagy et al. | |
| 2007/0234365 A1* | 10/2007 | Savit | 718/104 |
| 2008/0216082 A1* | 9/2008 | Eilam et al. | 718/104 |
| 2008/0256238 A1* | 10/2008 | Hu et al. | 709/226 |
| 2009/0199192 A1* | 8/2009 | Laithwaite et al. | 718/104 |
| 2009/0249350 A1* | 10/2009 | Senders et al. | 718/104 |
| 2012/0179824 A1* | 7/2012 | Jackson | 709/226 |
| 2013/0061233 A1 | 3/2013 | Zhou et al. | |

OTHER PUBLICATIONS

Ganek, Alan G., and Thomas A. Corbi. "The dawning of the autonomic computing era." IBM systems Journal 42.1 (2003): pp. 5-18.*

Nathuji, Ripal, Aman Kansal, and Alireza Ghaffarkhah. "Q-clouds: managing performance interference effects for qos-aware clouds." Proceedings of the 5th European conference on Computer systems. ACM, 2010, pp. 237-250.*

Insoon J. et al. "Workload-aware VM Scheduling on Multicore Systems", Insoon Jo et al./International Journal on Computer Science and Engineering (IJCSE). vol. 3 No. 2011. Nov. 2011, pp. 3634-3644.

"IBM Platform LSF V9.1 delivers significant performance and scalability advances". IBM United States Software Announcement 212-423, dated Nov. 13, 2012.

Calheiros, et al., "CloudSim: a toolkit for modeling and simulation of cloud computing environments and evaluation of resource provisioning algorithms", Software—Practice and Experience, 2011, 41:23-50, Published online Aug. 24, 2010 in Wiley Online Library, Copyright © 2010 John Wiley & Sons, Ltd., pp. 23-50.

Doyle, et al., "Model-Based Resource Provisioning in a Web Service Utility", USENIX Symposium on Internet Technologies and Systems, vol. 4, 2003, pp. 1-14.

Garg, et al., "SLA-Based Resource Provisioning for Heterogeneous Workloads in a Virtualized Cloud Datacenter", ICA3PP 2011, Part 1, LNCS 7016, pp. 371-384, © Springer-Verlag Berlin Heidelberg 2011.

* cited by examiner

SCHEDULING WORKLOADS AND MAKING PROVISION DECISIONS OF COMPUTER RESOURCES IN A COMPUTING ENVIRONMENT

CROSS-REFERENCE TO RELATED APPLICATIONS

This application is a continuation of U.S. patent application Ser. No. 14/081,207 filed on Nov. 15, 2013, the entire content and disclosure of which is incorporated herein by reference.

FIELD OF THE INVENTION

The present invention relates generally to the field of computer resource management, and more particularly to scheduling workloads on computer resources.

STATEMENT REGARDING PRIOR DISCLOSURES BY THE INVENTOR OR A JOINT INVENTOR

Various aspects of the present invention have been disclosed in the product Dynamic Cluster Version 9.1, made publicly available on Dec. 14, 2012. This disclosure is submitted under 35 U.S.C. 102(b)(1)(A). The following documentation is provided in support:
   IBM United States Software Announcement 212-423, IBM Platform LSF V9.1 delivers significant performance and scalability advances;
   Dynamic Cluster, Version 9.1 User Guide.

BACKGROUND OF THE INVENTION

In a workload scheduling system, a plurality of physical machines, virtual machines, and servers can exist to be utilized for execution of workloads. Workloads include batch jobs, computational tasks, application programs, or other processes, and each workload requires a specific set of resources for execution. Users of the workload scheduling system submit workloads into the system, where the workloads are scheduled and executed utilizing resources of the physical machines, virtual machines, and servers. Each physical machine, virtual machine, and server is comprised of resources, which include memory, software licenses, applications, central processing units (CPUs), cores, hyper-threads, operating systems, and disk space. A resource can include one or more sub-resources (e.g., a physical machine or a virtual machine is a resource that can have sub-resources of multiple CPUs, a CPU is a resource that can have sub-resources of multiple cores, a core is a resource that can have multiple hyper-threads, etc.). A server can host multiple virtual machines, and a hypervisor can control provisioning and allocation of the resources of the server to each virtual machine on the server. A hypervisor is a piece of hardware, software, or firmware that is utilized to create and run virtual machines, and manage resources that are available to the virtual machines. Provisioning of resources configures servers and physical machines corresponding to resource requirements (e.g., resources requirements of deployed workloads), allowing for execution of workloads with the corresponding resource requirements.

SUMMARY

Embodiments of the present invention disclose a computer implemented method, computer program product, and system for workload scheduling and resource provisioning. In one embodiment, in accordance with the present invention, the computer implemented method includes the steps of scheduling a set of pending workloads for execution on computer resources in a computing environment; identifying a workload in the set of pending workloads that is scheduled to utilize hypothetic resources, wherein hypothetic resources are idle computer resources that are currently not available, but can be made available to execute workloads through provisioning actions; holding the identified workload from dispatch to hypothetic resources for a holding period, wherein the holding period is a customizable duration of time; provisioning the hypothetic resources corresponding to computer resource requirements of the identified workload; and determining whether the provisioned hypothetic resources have become available during the holding period. In another embodiment, responsive to determining that the provisioned hypothetic resources have become available during the holding period, dispatching the identified workload to the corresponding provisioned hypothetic resources.

DETAILED DESCRIPTION

Embodiments of the present invention allow for scheduling workloads on idle resources within a computing environment. A workload scheduler receives workloads to execute using resources on physical machines and virtual machines. The workload scheduler determines a list of idle resources on physical machines and virtual machines, and schedules a set of pending workloads for execution on the determined idle resources. A provisioning system provisions the determined resources so that the pending workloads can be executed, and the workload scheduler sends the pending workloads to the physical machines and virtual machines for execution.

Embodiments of the present invention recognize that in a workload scheduling system, many resources can be idle at a given time. In a complex workload scheduling system, finding a matched resource for a workload is not the only factor in deciding whether or not the workload can be dispatched to the resource. The scheduling process includes a variety of different policies, which are utilized to decide which sets of resources are scheduled to execute which workloads.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the C programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

Figure 1:
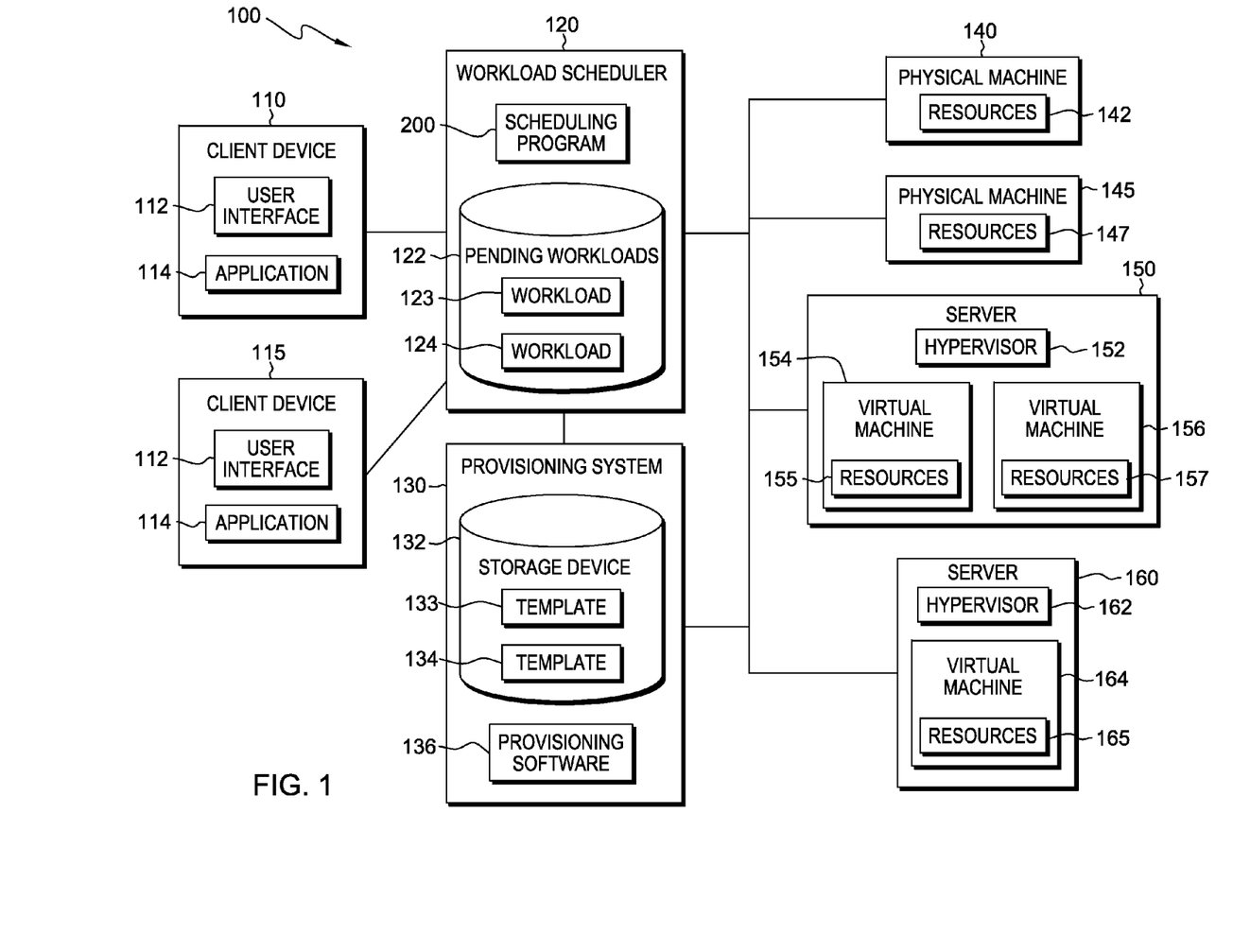
FIG. 1 is a functional block diagram of a data processing environment in accordance with an embodiment of the present invention.

The present invention will now be described in detail with reference to the Figures. FIG. 1 is a functional block diagram illustrating data processing environment 100, in accordance with one embodiment of the present invention.

An embodiment of data processing environment 100 includes client devices 110 and 115, workload scheduler 120, provisioning system 130, physical machines 140 and 145, and servers 150 and 160, all interconnected over network communications. Client devices 110 and 115 send workloads (e.g., workloads 123 and 124) to workload scheduler 120 for execution on physical machines 140 and 145, and servers 150 and 160. For example, a workload can be applications or programs (e.g., computational tasks, batch jobs, interactive sessions, etc.), that are submitted to run (pending), are currently running, or have finished running on resources of data processing environment 100. In various embodiments of the present invention, client devices 110 and 115 may be workstations, personal computers, personal digital assistants, mobile phones, or any other devices capable of executing program instructions in accordance with embodiments of the present invention. In general, client devices 110 and 115 are representative of any electronic device or combination of electronic devices capable of executing machine-readable program instructions, as described in greater detail with regard to FIG. 3, in accordance with embodiments of the present invention. Client devices 110 and 115 include respective instances of user interface 112 and application 114. User interface 112 accepts input from individuals utilizing client devices 110 and 115. Client devices 110 and 115 can utilize application 114 to select workloads to send to workload scheduler 120. Application 114 can be any form of application (e.g., web browser, software, etc.), that is capable of sending and receiving data from workload scheduler 120.

In one embodiment, client devices 110 and 115, workload scheduler 120, provisioning system 130, physical machines 140 and 145, and servers 150 and 160 communicate through network communications. Network communications can be, for example, a local area network (LAN), a telecommunications network, a wide area network (WAN) such as the Internet, or a combination of the three, and include wired, wireless, or fiber optic connections. In general, network communications can be any combination of connections and protocols that will support communications between client devices 110 and 115, workload scheduler 120, provisioning system 130, physical machines 140 and 145, and servers 150 and 160 in accordance with embodiments of the present invention.

In one embodiment, workload scheduler 120 receives workloads from client devices 110 and 115 (e.g., workloads 123 and 124), and schedules the received workloads on physical machines 140 and 145, and servers 150 and 160 corresponding to resource availability. In example embodiments, workload scheduler 120 can be a desktop computer, computer server, or any other computer system known in the art capable of performing functions in accordance with embodiments of the present invention. In certain embodiments, workload scheduler 120 represents computer systems utilizing clustered computers and components (e.g., database server computers, application server computers, etc.), that act as a single pool of seamless resources when accessed by elements of data processing environment 100 (e.g., client devices 110 and 115, provisioning system 130, physical machines 140 and 145, and servers 150 and 160). In general, workload scheduler 120 is representative of any electronic device or combination of electronic devices capable of executing machine-readable program instructions, as described in greater detail with regard to FIG. 3, in accordance with embodiments of the present invention.

Workload scheduler 120 includes pending workloads 122 and scheduling program 200. Pending workloads 122 store workloads received from users of workload scheduler 120 (e.g., client device 110 and 115), that have not yet been sent to physical machines 140 and 145, and servers 150 and 160 for execution. In one embodiment, pending workloads 122 includes workloads 123 and 124. Workloads 123 and 124 represent workloads, that client devices 110 and 115 have submitted to workload scheduler 120, which have not yet been executed. In example embodiments, workload 123 and workload 124 have different resource requirements for execution. For example, workload 123 has resource requirements of Application A, one CPU, and 1 Gigabyte (GB) of memory, and workload 124 has resource requirements of Application C, Software B and a corresponding software license, 1 CPU, and 2 GB of memory. Pending workloads 122 can be implemented with any type of storage device, for example, persistent storage 308, which is capable of storing data that may be accessed and utilized by client devices 110 and 115, workload scheduler 120, provisioning system 130, physical machines 140 and 145, and servers 150 and 160 such as a database server, a hard disk drive, or flash memory. In other embodiments, pending workloads 122 can represent multiple storage devices within workload scheduler 120. In various embodiments, scheduling program 200 schedules workloads on idle resources within a computing environment, in accordance with embodiments of the present invention.

In one embodiment, provisioning system 130 provisions resources of physical machines 140 and 145, and servers 150 and 160 (e.g., respective instances of resources 142, 147, 155, 157 and 165), corresponding to requirements of workloads in pending workloads 122. In example embodiments, provisioning system 130 can be a desktop computer, computer server, or any other computer system known in the art capable of performing functions in accordance with embodiments of the present invention. In certain embodiments, provisioning system 130 represents computer systems utilizing clustered computers and components (e.g., database server computers, application server computers, etc.), that act as a single pool of seamless resources when accessed by elements of data processing environment 100 (e.g., client devices 110 and 115, workload scheduler 120, physical machines 140 and 145, and servers 150 and 160). In general, provisioning system 130 is representative of any electronic device or combination of electronic devices capable of executing machine-readable program instructions, as described in greater detail with regard to FIG. 3, in accordance with embodiments of the present invention.

Provisioning system 130 includes storage device 132 and provisioning software 136. Storage device 132 stores templates that provisioning system 130 utilizes to provision resources of physical machines 140 and 145, and servers 150 and 160. In one embodiment, storage device 132 stores templates 133 and 134. Templates 133 and 134 include specifications and executable procedures that provisioning system 130 can utilize to provision physical machines 140 and 145, and servers 150 and 160. In an embodiment, templates 133 and 134 include all parameters necessary to provision physical machines 140 and 145, and servers 150 and 160 (e.g., variables, attributes, binaries, scripts, disk images, etc.). Storage device 132 can be implemented with any type of storage device, for example, persistent storage 308, which is capable of storing data that may be accessed and utilized by client devices 110 and 115, workload scheduler 120, provisioning system 130, physical machines 140 and 145, and servers 150 and 160 such as a database server, a hard disk drive, or flash memory. In other embodiments, storage device 132 can represent multiple storage devices within provisioning system 130.

In example embodiments, provisioning system 130 utilizes provisioning software 136 to provision resources of physical machines 140 and 145, and servers 150 and 160 corresponding to templates (e.g., templates 133 and 134), and requirements of workloads (of workload scheduler 120). Provisioning is the process of configuring resources (e.g., of physical machines 140 and 145, and servers 150 and 160), based on resource requirements of workloads on workload scheduler 120. For example, provisioning system 130 can utilize template 133 to provision resources of physical machines 140 and 145, and servers 150 and 160 to execute workload 123, and template 134 to provision resources of physical machines 140 and 145, and servers 150 and 160 to execute workload 124. In this example, template 133 and template 134 include specifications and procedures that include, but are not limited to the requirements of workloads 123 and 124 respectively.

Physical machines 140 and 145 include respective instances of resources 142 and 147. In example embodiments, physical machines 140 and 145 can be desktop computers, computer servers, or any other computer systems known in the art capable of performing functions in accordance with embodiments of the present invention. Resources 142 and 147 of physical machines 140 and 145 are computer resources that are utilized to execute programs (i.e. workloads 123 and 124), and can include, but are not limited to: memory, software licenses, applications, central processing units (CPUs), operating systems, network bandwidth, and disk space. Workload scheduler 120 can schedule workloads to utilize resources of physical machines 140 and 145, and provisioning system 130 can provision the resources corresponding to workloads.

In one embodiment, server 150 includes hypervisor 152 and virtual machines 154 and 156, and server 160 includes hypervisor 162 and virtual machine 164. In example embodiments, servers 150 and 160 can be desktop computers, computer servers, or any other computer systems known in the art capable of performing functions in accordance with embodiments of the present invention. In certain embodiments, servers 150 and 160 represent computer systems utilizing clustered computers and components (e.g., database server computers, application server computers, etc.), that act as a single pool of seamless resources when accessed by elements of data processing environment 100 (e.g., client devices 110 and 115, workload scheduler 120, and provisioning system 130). In general, servers 150 and 160 is representative of any electronic device or combination of electronic devices capable of executing machine-readable program instructions, as described in greater detail with regard to FIG. 3, in accordance with embodiments of the present invention.

In one embodiment, virtual machines 154 and 156 on server 150 and virtual machine 164 on server 160 include respective instances of resources 155, 157 and 165. Resources 155, 157 and 165 of servers 150 and 160 are computer resources that are utilized to execute programs (i.e. workloads 123 and 124), and can include, but are not limited to: memory, software licenses, applications, central processing units (CPUs), operating systems, network bandwidth, and disk space. In example embodiments, provisioning system can provision virtual machines that include resources of servers 150 and 160 (e.g., virtual machines 154, 156 and 164). In other embodiments, servers 150 and 160 can include more virtual machines in addition to virtual machines 154, 156 and 164. Workload scheduler 120 schedules workloads to utilize resources of virtual machines on servers 150 and 160. A hypervisor (i.e., hypervisors 152 and 162), is a piece of hardware, software, or firmware on a server (e.g., servers 150 and 160), that is utilized to create and run virtual machines, and manage resources that are available to the virtual machines. Hypervisors 152 and 162 control resource allocation to virtual machines 154, 156 and 164 on respective servers 150 and 160. In one embodiment, provisioning system 130 can utilize hypervisors 152 and 162 to provision resources on servers 150 and 160.

Figure 2:
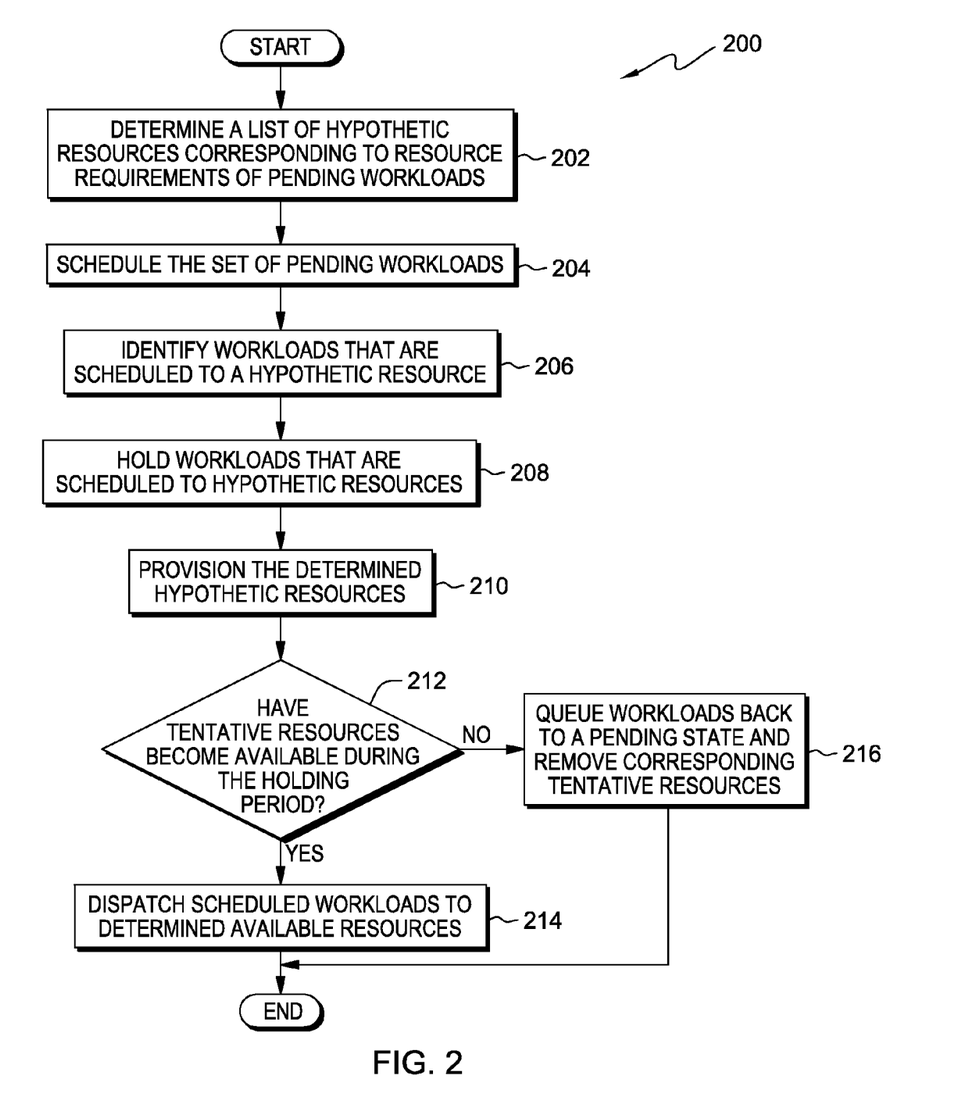
FIG. 2 is a flowchart depicting operational steps of a program for scheduling workloads on idle resources within a computing environment, in accordance with an embodiment of the present invention.

FIG. 2 is a flowchart depicting operational steps of scheduling program 200 in accordance with an embodiment of the present invention. In one embodiment, workload scheduler 120 is continuously scheduling workloads on physical machines 140 and 145, and servers 150 and 160, and scheduling program 200 initiates responsive to workload scheduler 120 receiving workloads from client devices 110 and 115.

Scheduling program 200 determines a list of hypothetic resources corresponding to resource requirements of pending workloads (step 202). In one embodiment, scheduling program 200 determines a list of hypothetic resources on physical machines 140 and 145, and servers 150 and 160 that correspond to the resource requirements of workloads in pending workloads 122 (i.e., workload 123 and workload 124). A hypothetic resource is an idle computer resource that is currently not available, but can be made available to execute workloads through provisioning actions of provisioning system 130, provided that adequate physical room is available for the provisioning actions (e.g. disk space for installing Software B, or 2 GB idle memory in a server for adding the memory to a virtual machine). For example, physical machine 140 is utilizing resources 142 to execute a workload, and resources 142, provisioned to physical machine 140, include 2 CPUs, 4 GB memory, but not Software B and a corresponding software license. If the workload being executed on physical machine 140 only uses 1 CPU and 2 GB memory, and a pending workload requires 1 CPU, 2 GB memory, and Software B and the corresponding software license, then workload scheduler 120 can utilize scheduling program 200 to detect that physical machine 140 has 1 CPU and 2 GB memory idle. In this example, scheduling program 200 can then make a scheduling decision to provision Software B and the corresponding software license in resources 142 in physical machine 140, and allocate the idle 1 CPU, 2 GB memory, and to-be-provisioned Software B, and the corresponding software license, in resources 142, for the pending workload. In this case, Software B and the corresponding software license are hypothetic resources because Software B and the corresponding software license are currently not available (i.e., do not exist), in resources 142, unless provisioning actions (by provisioning system 130), are performed to make Software B and the corresponding software license available.

In an example, workload 123 has resource requirements of Application A, 1 CPU, and 1 Gigabyte (GB) of memory, and workload 124 has resource requirements of Application C, Software B and the corresponding software license, 1 CPU, and 2 GB of memory. Scheduling program 200 analyzes resource availabilities of physical machines 140 and 145, and servers 150 and 160 to determine a list of hypothetic resources corresponding to the resource requirements of workloads 123 and 124. In this example, scheduling program 200 determines a list indicating that resources 155, of virtual machine 154, include 1 idle CPU, but need to provision hypothetic resources of Application C, Software B and the corresponding software license, and 2 GB of memory for workload 124; server 150 includes capacity or idle resources to provision a new virtual machine of hypothetic resources of Application A, 1 CPU, and 1 GB of memory for workload 123; and resources 142 of physical machine 140 include Application C, 1 idle CPU, and 2 GB of idle memory, but need to provision hypothetic resources of Software B and the corresponding software license for workload 124.

Scheduling program 200 then schedules the set of pending workloads (step 204). In one embodiment, scheduling program 200 schedules the workloads in pending workloads 122 on resources of physical machines 140 and 145, and servers 150 and 160, which may include hypothetic resources (determined in step 202). Scheduling program 200 utilizes scheduling policies that are associated with workload scheduler 120 to determine which resources of physical machines 140 and 145 and servers 150 and 160 to utilize for scheduling workloads. In one example, if workload 123 has been in pending workloads 122 longer than workload 124, then a scheduling policy can indicate that scheduling program 200 is to give workload 123 priority over workload 124. In this example, since workload 123 has priority over workload 124, the idle resources of server 150 will be used to provision a new virtual machine for workload 123, instead of utilizing the hypothetic resources of Application C and 2 GB of memory (which can be utilized for workload 124). In another example, different users of workload scheduler 120 can have a resource fair-share policy (e.g., for equal share, if client device 110 has already been allocated five instances of Software B and the corresponding software license for running workloads, client device 115 only has two instances of Software B and the corresponding software license for running workloads, then pending workload 124 of client device 115, for Software B and the corresponding software license, will be given a higher priority). In an embodiment, scheduling program 200 prefers scheduling workloads on actually available resources (i.e., idle resources that do not require provisioning) over hypothetic resources.

Since hypothetic resources are not currently available, scheduling program 200 predicts potential values of the hypothetic resources for the scheduling process (of step 204), to evaluate whether the hypothetic resources can meet resource requirements of pending workloads. Scheduling program 200 evaluates whether the hypothetic resources can meet resource requirements of workloads in pending workloads 122 by distinguishing the hypothetic resources into different types. A static resource is a resource that does not change before or after provisioning (e.g., CPU model, number of CPU cores of a physical machine, maximum memory size of a physical machine, etc.). Scheduling program 200 can utilize the statically configured values of the static resources. A provisionable resource can be changed by provisioning, but not by running a workload (e.g., operating system type and version, provisioned memory size of a virtual machine, provisioned CPUs of a virtual machine, etc.). Since the resources are provisionable, the provisioned values can be listed in a template utilized to provision the resource. Then scheduling program 200 can retrieve the provision values from the template to evaluate whether the provisionable resources meet workload resource requirements. A dynamic resource can change at any time while a physical machine, virtual machine, or server is running, with or without workloads (e.g., CPU utilization, current free memory size, etc.). A template of the dynamic resources can indicate the least loaded values of the dynamic resources, which considers possible resource consumption of the system (e.g., operating system, software, etc.). Then scheduling program 200 can use the least loaded values of the dynamic resources to evaluate whether the dynamic resources meet workload resource requirements, because the newly provisioned dynamic resources of hypothetic resources are not used by any workloads yet.

Scheduling program 200 then identifies workloads that are scheduled to a hypothetic resource (step 206). In one embodiment, scheduling program 200 identifies which workloads of pending workloads 122 are scheduled (in step 204) to hypothetic resources (determined in step 202). For example, if in step 204 scheduling program 200 schedules workload 124 to resources determined to be hypothetic resources (from step 202), then scheduling program 200 identifies workload 124 as being scheduled to the hypothetic resources (e.g., hypothetical resources of Software B and the corresponding software license in resources 142 of physical machine 140).

Scheduling program 200 then holds workloads that are scheduled to hypothetic resources (step 208). In one embodiment, scheduling program 200 places a hold on workloads that are scheduled to hypothetic resources (identified in step 206), so that the held workloads can remain in pending workloads 122 until corresponding resources are provisioned. In example embodiments, the duration of time of the holding period is customizable. During the holding period of a workload, the hypothetic resources (e.g. to-be-provisioned Software B and the corresponding software license in resources 142, of physical machine 140, allocated for workload 124), and other available resources (e.g. already-available Application C, 1 CPU, and 2 GB of memory in resources 142 of physical machine 140 allocated for workload 124), will be held as well so that the resources will not be allocated to other pending workloads.

Scheduling program 200 then provisions the determined hypothetic resources (step 210). In one embodiment, scheduling program 200 utilizes provisioning system 130 to provision the determined hypothetic resources (determined in step 202) to allow for execution of pending workloads 122. Provisioning system 130 utilizes provisioning templates in storage device 132 (i.e., templates 133 and 134), to provision the determined hypothetic resources into resources that workload scheduler 120 can utilize to execute workloads, which scheduling program 200 marks as tentative resources. A tentative resource is a hypothetic resource that scheduling program 200 has utilized, or is utilizing provisioning system 130 to provision. In one embodiment, scheduling program 200 can schedule additional workloads onto tentative resources. Once hypothetic resources are marked as tentative resources, workload scheduler 120 can schedule more pending workloads to the tentative resources without going through step 202 to re-determine the resources as hypothetic resources.

In a previously discussed example, workload 123 has resource requirements of Application A, 1 CPU, and 1 Gigabyte (GB) of memory, and workload 124 has resource requirements of Application C, Software B and the corresponding software license, 1 CPU, and 2 GB of memory. In this example, scheduling program 200 utilizes provisioning system 130 (and template 133), to provision a new virtual machine of hypothetic resources of Application A, 1 CPU, and 1 GB of memory for workload 123. Scheduling program 200 also utilizes provisioning system 130 (and template 134), to provision Software B, and the corresponding software license, in resources 142 of physical machine 140, for workload 124. Scheduling program 200 marks the being-provisioned hypothetic resources as tentative resources. Once Software B and the corresponding software license in resources 142 of physical machine 140 are marked as tentative resources, scheduling program 200 can schedule a pending workload of client device 110 for Software B and the corresponding software license to the tentative resources in resources 142 of physical machine 140 (e.g., as in a previously discussed resource fair-share policy example).

Scheduling program 200 then determines whether the tentative resources have become available during the holding period (decision step 212). In one embodiment, scheduling program 200 determines whether the being-provisioned hypothetic resources (i.e., tentative resources of step 210), have been provisioned successfully during the holding period (of step 208) and are available for the execution of workloads. Scheduling program 200 considers a tentative resource to be available if the provisioning actions (of step 210) that provisioning system 130 performs have been executed successfully during the previously specified holding period (in step 208). If the provisioning actions are successfully completed during the time duration of the holding period, then the tentative resources are available to execute workloads.

In step 214, scheduling program 200 dispatches the scheduled workloads to the determined available resources. In one embodiment, responsive to determining that the tentative resources have become available during the holding period (decision step 212, "yes" branch), scheduling program 200 dispatches the workloads scheduled for execution (in step 204) to the determined available resources that have been allocated to the workloads (of step 212). Scheduling program 200 dispatches the held workloads from pending workloads 122 to the determined available resources of physical machines 140 and 145, and servers 150 and 160. In the previously discussed example of workload 124, if provisioning system 130 successfully provisions a new virtual machine on server 150 for workload 123, and Software B and the corresponding software license of resources 142, of physical machine 140, for workload 124 within the specified holding period, then scheduling program 200 determines that the tentative resources have become available (decision step 212). Responsive to determining that the corresponding tentative resources are available, scheduling program 200 dispatches workload 123 to the new virtual machine on server 150 for execution, and workload 124 to resources 142 of physical machine 140 for execution.

In step 216, scheduling program 200 queues workloads back to a pending state and removes corresponding tentative resources. In one embodiment, responsive to determining that the tentative resources have not become available during the holding period (decision step 212, "no" branch), scheduling program 200 returns the workloads scheduled to the determined not available resources back to a pending state (e.g., in pending workloads 122), and removes the tentative resources that were determined not to be available. In an example embodiment, if a tentative resources does not become available within the holding period, then the provisioning (in step 210), of the tentative resources may have failed (e.g., error resulting in provisioning action of provisioning system 130 failing), or the provisioning actions did not execute within the holding period (e.g., error resulting in provisioning action of provisioning system 130 timing out). In another embodiment, responsive to determining that the tentative resources have not become available during the holding period (decision step 212, "no" branch), scheduling program cancels any pending provisioning actions corresponding to the tentative resources (i.e., removing the tentative resources). In the previously discussed example of workload 123, if provisioning system 130 does not successfully provision a new virtual machine on server 150 within the specified holding period, then scheduling program 200 determines that the tentative resources are not available. Responsive to determining that the corresponding tentative resources are not available (decision step 212), scheduling program 200 queues workload 123 back to a pending state in pending workloads 122 and cancels the provisioning actions corresponding to the new virtual machine on server 150.

In other embodiments, to avoid overhead costs of frequent or repetitive provisioning actions, once tentative resources are determined to be available (in decision step 212), the available resources can remain provisioned (e.g., in physical machines 140 and 145, and servers 150 and 160) for a period of time. The period of time can be a configurable duration of time, during which additional workloads can be scheduled to the provisioned resources. For example, a time-to-live time duration (e.g., starts counting when a machine is powered on), or a time-to-idle time duration (e.g., starts counting when a machine becomes idle). After the time period expires, the provisioned resources can be removed or re-provisioned back into resources of physical machines 140 and 145 or servers 150 and 160.

Figure 3:
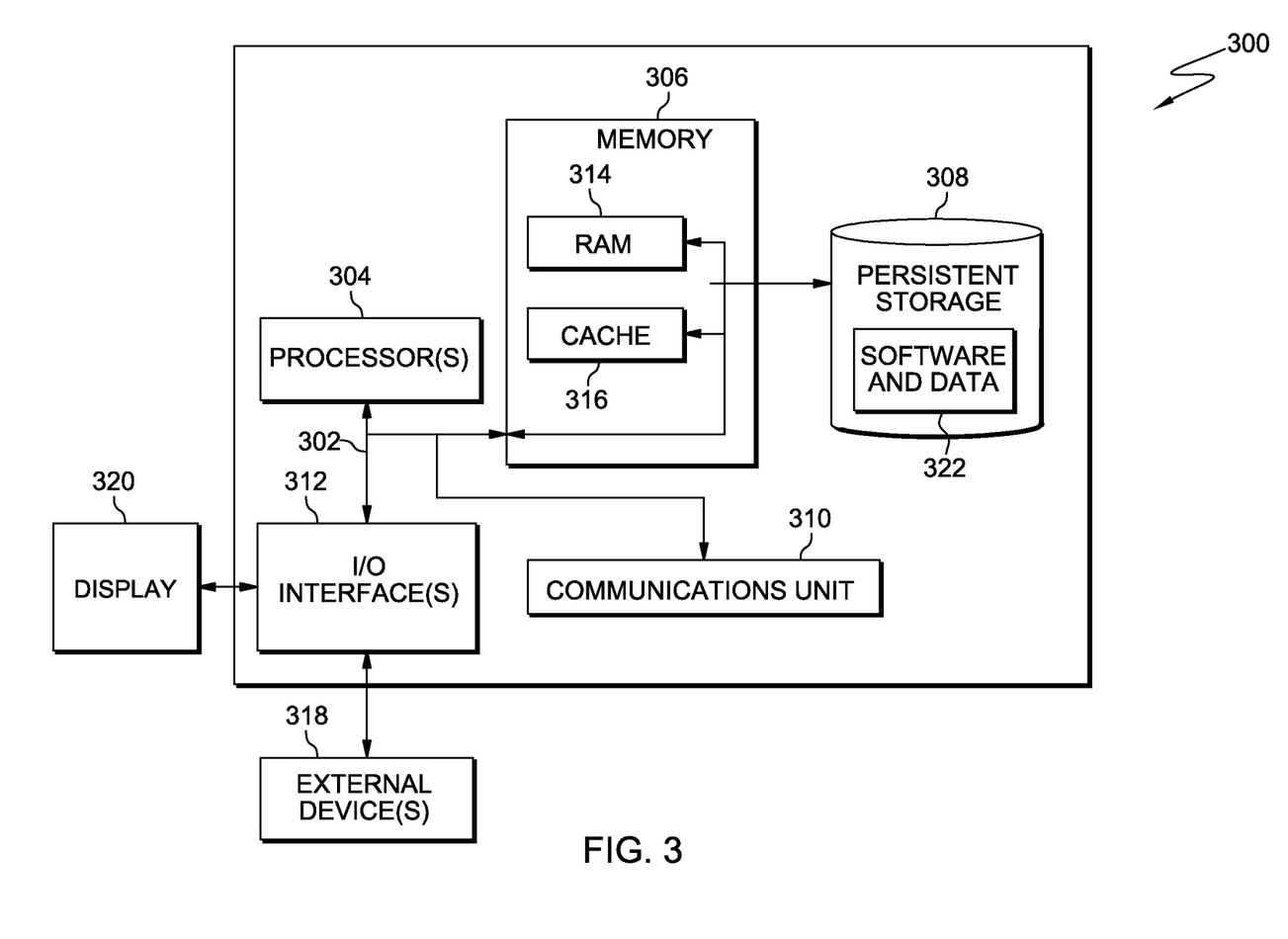
FIG. 3 depicts a block diagram of components of the computing system of FIG. 1 in accordance with an embodiment of the present invention.

FIG. 3 depicts a block diagram of components of computer 300, which is representative of client devices 110 and 115, workload scheduler 120, provisioning system 130, physical machines 140 and 145, and servers 150 and 160 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media. Software and data 322 are stored in persistent storage 308 for access and/or execution by processor(s) 304 via one or more memories of memory 306. With respect to client devices 110 and 115, software and data 322 represent application 114. With respect to workload scheduler 120, software and data 322 represents workloads 123 and 124, and scheduling program 200. With respect to provisioning system 130, software and data 322 represents templates 133 and 134, and provisioning software 136. With respect to server 150, software and data 322 represents hypervisor 152, and virtual machines 154 and 156. With respect to server 160, software and data 322 represents hypervisor 162, and virtual machine 164.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 may include one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data 322 can be stored on such portable computer-readable storage media and can be loaded onto persistent storage 308 via I/O interface(s) 312. I/O interface(s) 312 also can connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for workload scheduling and resource provisioning carried out by one or more processors, the method comprising the steps of:
: scheduling a set of pending workloads for execution on computer resources in a computing environment;
: identifying a workload in the set of pending workloads that is scheduled to utilize hypothetic resources, wherein hypothetic resources are idle computer resources that are currently not available, but the idle computer resources are capable of undergoing provisioning actions to make the idle computer resources available to execute workloads;
: holding the identified workload from dispatch to hypothetic resources for a holding period, wherein the holding period is a customizable duration of time;
: provisioning, utilizing provisioning templates associated with computer resources, the hypothetic resources corresponding to computer resource requirements of the identified workload into a set of resources that allow for execution of the identified workload; and
: determining whether the provisioned hypothetic resources have become available during the holding period.

2. The method in accordance with claim 1, further comprising the step of:
: responsive to determining that the provisioned hypothetic resources have become available during the holding period, dispatching the identified workload to the corresponding provisioned hypothetic resources.

3. The method in accordance with claim 1, further comprising the steps of:
: responsive to determining that the provisioned hypothetic resources have not become available during the holding period, cancelling provisioning actions on the hypothetic resources; and
: returning the identified workload back to a pending state.

4. The method in accordance with claim 1, further comprising the steps of:
: determining a list of hypothetic resources corresponding to computer resource requirements of the set of pending workloads; and
: determining whether potential values of hypothetic resources can meet resource requirements of pending workloads,
: wherein the set of pending workloads are scheduled for execution on computer resources in the computing environment that include computer resources and hypothetic resources.

5. The method in accordance with claim 1, wherein the computer resources include memory, central processing units (CPUs), software licenses, applications, network bandwidth, operating systems and disk space located on physical machines and virtual machines in the computing environment.

6. The method in accordance with claim 1, wherein provisioned hypothetic resources are available when the hypothetic resources are provisioned successfully during the holding period and are available for the execution of workloads.

7. The method in accordance with claim 1, wherein scheduling a set of pending workloads for execution on computer resources in a computing environment, further comprises the steps of:
: identifying idle computing resources in the computing environment;
: determining a list of hypothetic resources corresponding to computer resource requirements of the set of pending workloads utilizing the identified idle computing resources in the computing environment; and
: scheduling the set of pending resources for execution on computer resources in the computing environment that include computer resources and hypothetic resources.

* * * * *